United States Patent
Kanekiyo et al.

(10) Patent No.: US 6,695,929 B2
(45) Date of Patent: Feb. 24, 2004

(54) METHOD OF MAKING MATERIAL ALLOY FOR IRON-BASED RARE EARTH MAGNET

(75) Inventors: Hirokazu Kanekiyo, Kyoto (JP); Satoshi Hirosawa, Otsu (JP)

(73) Assignee: Sumitomo Special Co., Ltd., Osaka (JP)

( * ) Notice: Subject to any disclaimer, the term of this patent is extended or adjusted under 35 U.S.C. 154(b) by 0 days.

(21) Appl. No.: 10/203,023

(22) PCT Filed: Feb. 4, 2002

(86) PCT No.: PCT/JP02/00902

§ 371 (c)(1),
(2), (4) Date: Aug. 5, 2002

(87) PCT Pub. No.: WO02/067275

PCT Pub. Date: Aug. 29, 2002

(65) Prior Publication Data

US 2003/0136468 A1 Jul. 24, 2003

(30) Foreign Application Priority Data

Feb. 7, 2001 (JP) ........................................ 2001-031484

(51) Int. Cl.⁷ ............................................... H01F 1/057
(52) U.S. Cl. .................. 148/101; 148/102; 148/538; 148/540; 164/463; 164/474; 164/475; 164/477; 164/479; 164/488; 164/489; 164/490
(58) Field of Search ................. 148/101, 102, 148/103, 538, 540; 164/463, 474, 475, 477, 479, 488, 489, 490

(56) References Cited

U.S. PATENT DOCUMENTS

| | | | |
|---|---|---|---|
| 4,770,723 A | | 9/1988 | Sagawa et al. |
| 4,842,656 A | | 6/1989 | Maines et al. |
| 5,630,885 A | * | 5/1997 | Yamamoto et al. ......... 148/122 |
| 5,674,327 A | | 10/1997 | Yamamoto et al. |
| 5,690,752 A | * | 11/1997 | Yamamoto et al. ......... 148/302 |
| 6,328,825 B1 | * | 12/2001 | Hasegawa et al. .......... 148/541 |
| 2002/0117235 A1 | * | 8/2002 | Kanekiyo et al. ........... 148/101 |
| 2003/0098094 A1 | * | 5/2003 | Hasegawa et al. .......... 148/302 |

FOREIGN PATENT DOCUMENTS

| | | |
|---|---|---|
| EP | 0 753 867 | 1/1997 |
| WO | WO 00/03403 | 1/2000 |

OTHER PUBLICATIONS

US 4,756,775, 7/1988, Croat (withdrawn)

R. Coehoorn et al., "Novel Permanent Magnetic Materials Made by Rapid Quenching", Journal de Physique, Colloque C8, Supplèment au No. 12, Tome 19, Dec. 1988, pp. C8-669-C8-670.

W.C. Chang et al., "The Effects of Refractory Metals on the Magnetic Properties of $\alpha$-Fe/$R_2Fe_{14}$B-Type Nanocomposites", IEEE Transactions on Magnetics, vol. 35. No. 5., Sep. 1999, pp. 3265-3267.

* cited by examiner

Primary Examiner—John Sheehan
(74) Attorney, Agent, or Firm—Keating & Bennett, LLP

(57) ABSTRACT

A melt of an iron-based rare earth material alloy, represented by $(Fe_{1-m}T_m)_{100-x-y-z}Q_xR_yM_z$, is prepared, wherein T is Co and/or Ni; Q is B and/or C; R is selected from Y (yttrium) and the rare earth elements; M is selected from Al, Si, Ti, V, Cr, Mn, Cu, Zn, Ga, Zr, Nb, Mo, Ag, Hf, Ta, W, Pt, Au and Pb; $10 \leq x \leq 30$ at %; $2\% \leq y < 10$ at %; $0 \leq z \leq 10$ at % and $0 \leq m \leq 0.5$. The melt is fed onto a guide to form a flow of the melt thereon and move the melt onto a melt/chill roller contact region, where the melt is rapidly cooled by the chill roller to make a rapidly solidified alloy. An oxygen concentration of the melt yet to be fed onto the guide is controlled at about 3,000 ppm or less in mass percentage.

10 Claims, 1 Drawing Sheet

METHOD OF MAKING MATERIAL ALLOY FOR IRON-BASED RARE EARTH MAGNET

TECHNICAL FIELD

The present invention relates to a method of making a material alloy for an iron-based rare earth magnet, for use in, for example, motors and actuators of various types.

BACKGROUND ART

Recently, it has become more and more necessary to further improve the performance of, and further reduce the size and weight of, consumer electronic appliances, office automation appliances and various other types of electric equipment. For these purposes, a permanent magnet for use in each of these appliances is required to maximize its performance to weight ratio when operated as a magnetic circuit. For example, a permanent magnet with a remanence $B_r$ of 0.5 T or more is now in high demand. Hard ferrite magnets have been used widely because magnets of this type are relatively inexpensive. However, the hard ferrite magnets cannot achieve the high remanence $B_r$ of 0.5 T or more.

An Sm—Co type magnet, produced by a powder metallurgical process, is currently known as a typical permanent magnet that achieves the high remanence $B_r$ of 0.5 T or more. However, the Sm—Co type magnet is expensive, because Sm and Co are both expensive materials.

Examples of other high-remanence magnets include an Nd—Fe—B type sintered magnet produced by a powder metallurgical process and an Nd—Fe—B type rapidly solidified magnet produced by a melt quenching process. An Nd—Fe—B type sintered magnet is disclosed in Japanese Laid-Open Publication No. 59-46008, for example, and an Nd—Fe—B type rapidly solidified magnet is disclosed in Japanese Laid-Open Publication No. 60-9852, for instance. The Nd—Fe—B type sintered magnet is mainly composed of relatively inexpensive Fe (typically at about 60 wt % to about 70 wt % of the total weight), and is much less expensive than the Sm—Co type magnet. Nevertheless, it is still expensive to produce the Nd—Fe—B type magnet. This is partly because huge equipment and a great number of manufacturing and processing steps are required to separate and purify, or to obtain by reduction reaction, Nd, which usually accounts for about 10 at % to about 15 at % of the magnet. Also, a sintered compact should be further processed. Furthermore, a powder metallurgical process normally requires a relatively large number of manufacturing and processing steps by its nature.

Compared to an Nd—Fe—B type sintered magnet formed by a powder metallurgical process, an Nd—Fe—B type rapidly solidified magnet can be produced at a lower cost by a melt quenching process. This is because an Nd—Fe—B type rapidly solidified magnet can be produced through relatively simple process steps of melting, melt quenching and heat treating. However, to obtain a permanent magnet in bulk by a melt quenching process, a bonded magnet should be formed by compounding a magnet powder, made from a rapidly solidified alloy, with a resin binder. Accordingly, the magnet powder normally accounts for at most about 80 volume % of the molded bonded magnet. Also, a rapidly solidified alloy, formed by a melt quenching process, is magnetically isotropic.

As for an Nd—Fe—B type rapidly solidified magnet, an alternative magnet material was proposed by R. Coehoorn et al., in J. de Phys, C8, 1998, pp. 669–670. The Coehoorn material has a composition including a rare earth element at a relatively low mole fraction (i.e., around $Nd_{3.8}Fe_{77.2}B_{19}$, where the subscripts are indicated in atomic percentages); and an $Fe_3B$ phase as its main phase. This permanent magnet material is obtained by heating and crystallizing an amorphous alloy that has been prepared by a melt quenching process. Also, the crystallized material has a metastable structure in which soft magnetic $Fe_3B$ and hard magnetic $Nd_2Fe_{14}B$ phases coexist and in which crystal grains of very small sizes (i.e., on the order of several nanometers) are distributed finely and uniformly as a composite of these two crystalline phases. For that reason, a magnet made from such a material is called a "nanocomposite magnet".

It has been proposed that various metal elements be added to the material alloy of a nanocomposite magnet to improve the magnetic properties thereof. See, for example, PCT International Publication No. WO 003/03403 and W. C. Chan et. al., "The Effects of Refractory Metals on the Magnetic Properties of $\alpha$-Fe/$R_2Fe_{14}$B-type Nanocomposites", IEEE Trans. Magn. No.5, INTERMAG. 99, Kyongiu, Korea, pp. 3265–3267, 1999.

However, in producing a nanocomposite magnet by a melt quenching process, the microcrystalline structure of a rapidly solidified alloy is seriously affected by how a melt of a material alloy contact the surface of a chill roller, and the resultant magnet properties may sometimes deteriorate. Particularly when a nanocomposite magnet was be made by a strip casting process, the present inventors found it very difficult to obtain a rapidly solidified alloy having the desired micro crystalline structure uniformly and with good reproducibility. Specifically, when a melt of the material alloy was fed onto a chill roller by way of some guide such as a shoot, an oxide film was easily formed on the surface of the melt on the shoot. In that case, the melt flow was obstructed by the oxide film, and the rapid cooling process could not be carried out uniformly enough.

DISCLOSURE OF INVENTION

In order to overcome the problems described above, preferred embodiments of the present invention provide (1) a method of making an iron-based rare earth magnet material alloy that has a uniform microcrystalline structure required for a high-performance nanocomposite magnet by performing the manufacturing processing step of rapidly cooling and solidifying a molten alloy using a chill roller, constantly and with good reproducibility, and (2) a method for producing a permanent magnet by using the iron-based rare earth magnet material alloy.

According to a preferred embodiment of the present invention, a method of making a material alloy for an iron-based rare earth magnet includes the step of preparing a melt of an iron-based rare earth material alloy having a composition represented by the general formula $(Fe_{1-m}T_m)_{100-x-y-z}Q_xR_yM_z$. In this formula, T is at least one element selected from the group consisting of Co and Ni; Q is at least one element selected from the group consisting of B and C; R is at least one element selected from the group consisting of Y (yttrium) and the rare earth elements; and M is at least one element selected from the group consisting of Al, Si, Ti, V, Cr, Mn, Cu, Zn, Ga, Zr, Nb, Mo, Ag, Hf, Ta, W, Pt, Au and Pb. The mole fractions x, y, z and m satisfy the inequalities of: 10 at $\% \leq x \leq 30$ at %; 2 at $\% \leq y < 10$ at %; 0 at $\% \leq z \leq 10$ at %; and $0 \leq m \leq 0.5$, respectively. The method further includes the steps of feeding the melt of the material alloy onto a guide and forming a flow of the melt on the guide for tranfer to a chill roller so as to move the melt onto a region where the melt comes into contact with the chill roller; and rapidly cooling the melt using the chill roller to make a rapidly solidified alloy. The method further includes the step of controlling an oxygen concentration of the melt yet to be fed onto the guide such that the oxygen concentration is about 3,000 ppm or less in mass percentage.

In one preferred embodiment of the present invention, the method further includes the step of controlling a kinematic viscosity of the melt yet to be fed onto the guide such that the kinematic viscosity is about $5 \times 10^{-6}$ m$^2$/sec or less.

In another preferred embodiment of the present invention, the rapid cooling step includes the step of using, as the guide, a shoot that controls the flow of at least a portion of the melt running down toward the surface of the chill roller rotating to bring the melt into contact with the surface of the chill roller such that the melt has a predetermined width in an axial direction of the chill roller. The shoot is disposed near the chill roller and includes a melt drain that has the predetermined width in the axial direction of the chill roller. The rapid cooling step further includes the step of making the rapidly solidified alloy from the melt that has come into contact with the chill roller.

In still another preferred embodiment, the rapid cooling step preferably includes the step of precipitating an $R_2Fe_{14}B$ phase.

Another preferred embodiment of the present invention provides a method for producing a permanent magnet that includes the step of heat-treating the rapidly solidified alloy, prepared by the method according to any of the preferred embodiments of the present invention described above, to form a structure in which three or more crystalline phases, including at least $R_2Fe_{14}B$, α-Fe and boride phases, are present, an average crystal grain size of the $R_2Fe_{14}B$ phase is between about 20 nm and about 150 nm, and an average crystal grain size of the α-Fe and boride phases is preferably between about 1 nm and about 50 nm.

In one preferred embodiment of the present invention, the heat-treating step includes the step of maintaining the rapidly solidified alloy at a temperature of about 550° C. to about 850° C. for approximately 30 seconds or more.

In another preferred embodiment of the present invention, the boride phase includes an iron-based boride phase with ferromagnetic properties.

In this preferred embodiment, the iron-based boride phase includes at least one of $Fe_3B$ and $Fe_{23}B_6$.

Still another preferred embodiment of the present invention provides a method for producing a permanent magnet by using a powder of the rapidly solidified alloy that has been prepared by the method according to any of the preferred embodiments of the present invention described above.

According to yet another preferred embodiment of the present invention, a method for producing a bonded magnet includes the steps of preparing a powder of the permanent magnet according to any of the methods described above, and processing the powder of the permanent magnet into the bonded magnet.

Other features, elements, processes, steps, characteristics and advantages of the present invention will become more apparent from the following detailed description of preferred embodiments of the present invention with reference to the attached drawings.

BEST MODE FOR CARRYING OUT THE INVENTION

Figure 1:
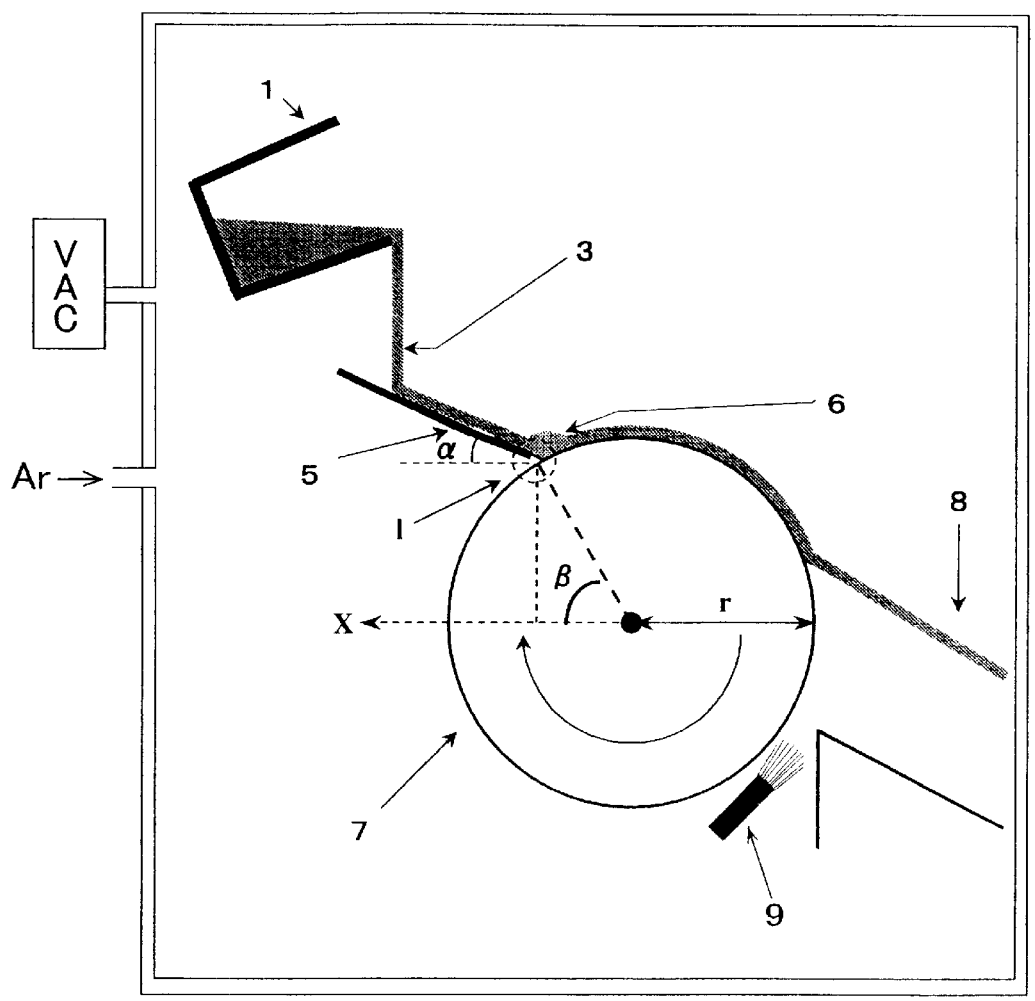
FIG. 1 illustrates the arrangement of an exemplary strip caster preferably used to make a rapidly solidified alloy as a material alloy for an iron-based rare earth magnet in various preferred embodiments of the present invention.

In preferred embodiments of the present invention, an iron-based rare earth material alloy, having a composition represented by the general formula $(Fe_{1-m}T_m)_{100-x-y-z}Q_xR_yM_z$, is prepared by a strip casting process. In this formula, T is at least one element selected from the group consisting of Co and Ni; Q is at least one element selected from the group consisting of B and C; R is at least one element selected from the group consisting of Y (yttrium) and the rare earth elements; and M is at least one element selected from the group consisting of Al, Si, Ti, V, Cr, Mn, Cu, Zn, Ga, Zr, Nb, Mo, Ag, Hf, Ta, W, Pt, Au and Pb. The mole fractions x, y, z and m satisfy the inequalities of: 10 at %≦x≦30 at %; 2 at %≦y<10 at %; 0 at %≦z≦10 at %; and 0≦m≦0.5, respectively.

In preferred embodiments of the present invention, a melt of the alloy having this composition is fed onto a chill roller by way of a guide such as a shoot or other suitable structure. By adjusting the tilt angle or the size of the guide, the melt flow being teemed onto the chill roller is controllable highly precisely. In one preferred embodiment of the present invention, the guide is disposed so as to tilt downward at an angle of about 5 to about 70 degrees with respect to a horizontal plane. The molten alloy, which has been poured onto the guide, flows laterally along the guide, moves toward a region in which the melt comes into contact with the chill roller, and forms a melt puddle on the surface of the rotating chill roller. Then, as the roller rotates, the melt moves upward from the puddle along the surface of the chill roller so as to be spread thinly on the roller surface and transported by the roller while keeping in close contact with the roller for a predetermined amount of time. In the meantime, the melt has its heat removed by the chill roller and is solidified. And the solidified alloy soon leaves the surface of the chill roller. The cooling rate is controllable to a desired range by adjusting the melt feeding rate and/or the surface velocity of the chill roller. If the viscosity of the molten alloy, forming the melt puddle on the chill roller, changes, then the overall melt quenching process also changes slightly. However, when a nanocomposite magnet is being produced as is done in preferred embodiments of the present invention, that slight variation of the quenching process alters the microcrystalline structure of the rapidly solidified alloy significantly and affects the properties of the resultant magnet seriously.

The present inventors discovered that to control the viscosity of the melt of the material alloy having the composition described above, not only the concentration of oxygen in the final magnet product or in the material alloy yet to be melted but also the concentration of oxygen in the molten alloy that is going to be poured onto the guide must be maintained at appropriate levels. The present inventors developed the basic concepts of the present invention from this discovery.

Specifically, in preferred embodiments of the present invention, the concentration of oxygen in the molten alloy that is going to be poured onto the guide is preferably about 3,000 ppm or less in mass percentage, thereby controlling the kinematic viscosity of the molten alloy at about $5 \times 10^{-6}$ m$^2$/sec or less. The present inventors discovered that the melt flow running down the guide toward the chill roller could be optimized and could keep an appropriate contact with the surface of the chill roller at that oxygen concentration. According to preferred embodiment of the present invention, the melt flow is stabilized in this manner. Thus, the uniformity of the rapidly solidified alloy is improvable and a high-performance magnet is produced with good reproducibility.

The material alloy for use in various preferred embodiments of the present invention includes, as its indispensable element, a rare earth element, which is chemically reactive against oxygen. Accordingly, in the molten state, the material alloy easily absorbs oxygen from an atmospheric gas or an oxide of a refractory material to form an oxide of a rare earth element. For that reason, the concentration of oxygen contained in the molten alloy tends to increase with time. In view of this consideration, the partial pressure of oxygen in the atmospheric gas and the time it takes the molten alloy to be rapidly cooled and solidified should be monitored and controlled appropriately. Therefore, the microcrystalline structure of the rapidly solidified alloy cannot be made uniform by merely controlling the oxygen concentration of the material alloy yet to be melted.

The present inventors discovered and confirmed via experiments that when the concentration of oxygen in the molten alloy exceeded about 3,000 ppm in mass percentage, a solid phase of a rare earth oxide coexisted in a liquid phase to increase the viscosity of the melt steeply. Although nobody reported about this phenomenon, it is particularly remarkable in a material alloy for a nanocomposite magnet, which often precipitates a plurality of metastable phases. With this finding in mind, the present inventors could successfully control the kinematic viscosity of the molten alloy at about $5 \times 10^{-6}$ m$^2$/sec or less and pour the molten alloy constantly enough by adjusting the concentration of oxygen in the molten alloy at about 3,000 ppm or less in mass percentage. The molten alloy with that kinematic viscosity could be cooled sufficiently on the chill roller and was not wound around the roller. As a result, the resultant rapidly solidified alloy could have a highly uniform microcrystalline structure.

On the other hand, if the oxygen concentration of the molten alloy exceeds about 3,000 ppm in mass percentage, then the kinematic viscosity of the molten alloy is greater than about $5 \times 10^{-6}$ m$^2$/sec. In that case, the melt shows a much lower flowability and cannot flow constantly on the guide. That is to say, the melt cannot be fed onto the chill roller at a constant rate. As a result, no uniform rapidly solidified alloy structure can be obtained. In addition, when the melt has a high kinematic viscosity, the melt that has reached the chill roller cannot be expanded on the roller surface easily. Thus, the resultant rapidly solidified alloy has an increased thickness and the melt quenching rate decreases. The experiments carried out by the present inventors revealed that the oxygen concentration of the melt is preferably about 2,000 ppm or less, more preferably about 1,000 ppm or less. The oxygen concentration of the melt is preferably as low as possible. However, if the melt should have an oxygen concentration of less than about 50 ppm, then the oxygen concentration of the material alloy yet to be melted and that of the atmospheric gas inside the melt quenching chamber must be further lowered, thus rather decreasing the productivity unintentionally. Accordingly, the melt should have an oxygen concentration of at least about 100 ppm in an actual manufacturing process.

In the field of an Nd—Fe—B type rare earth alloy sintered magnet, a technique of controlling the concentration of oxygen in its magnet powder at a predetermined level or less to improve the final properties of the sintered magnet has been known. This technique has been adopted to solve the problem that the volume percentage of the $Nd_2Fe_{14}B$ main phase decreases when the magnet powder contains oxygen at an excessively high percentage. This is because the rare earth element Nd is oxidized and consumed by that excessive oxygen. On the other hand, a nanocomposite magnet, which is the final product to be made by any of the methods of various preferred embodiments of the present invention, may include a rare earth element having a mole fraction smaller than that of a rare earth alloy sintered magnet. Accordingly, it was believed in the art that even if some of the rare earth element with that small mole fraction was oxidized and consumed, the resultant magnet properties would not be affected so seriously by that oxidation. It was not known either that the concentration of oxygen in a molten alloy greatly changes the kinematic viscosity thereof. Thus, nobody in the art had any idea about the technique of controlling the kinematic viscosity of a molten alloy by adjusting the concentration of oxygen in the molten alloy.

Hereinafter, appropriate ranges of other manufacturing and processing conditions will be exemplified.

First, to prevent the rapidly solidified alloy from being wound around the chill roller, the pressure of the atmospheric gas should be adjusted to an appropriate range during the melt quenching process. The atmospheric gas preferably has a pressure of about 10 kPa to about the atmospheric pressure. If the pressure of the atmospheric gas is less than about 10 kPa, then the thin-strip solidified alloy might adhere to the surface of the chill roller too strongly. On the other hand, if the pressure of the atmospheric gas is greater than about the atmospheric pressure (i.e., 101.3 kPa), then the atmospheric gas will get trapped in the gaps between the roller surface and the melt, thus producing gas pockets more easily. Once those gas pockets have been created, the melt cannot be quenched sufficiently anymore by the chill roller. As a result, α-Fe phases of an excessively large size precipitate and desirable hard magnetic properties are not realizable.

The present inventors discovered and confirmed via experiments that the rapid-cooling atmospheric gas preferably has a pressure of about 10 kPa to about the atmospheric pressure (i.e., 101.3 kPa), more preferably from about 20 kPa to about 90 kPa, and even more preferably from about 30 kPa to about 60 kPa.

The surface velocity of the chill roller is preferably from about 5 m/sec to about 20 m/sec. The reason is as follows. If the surface velocity of the chill roller is lower than about 5 m/sec, then the crystal grains of the $R_2Fe_{14}B$ phase included in the rapidly solidified alloy will have an excessively large size, and its average crystal grain size will exceed about 150 nm. In that case, when the rapidly solidified alloy is heat-treated, the $R_2Fe_{14}B$ phase will further grow to deteriorate the magnetic properties seriously. On the other hand, if the roller surface velocity is higher than about 20 m/sec, then almost all of the rapidly solidified alloy will be amorphized and substantially no $R_2Fe_{14}B$ phase will precipitate. In that case, when such a rapidly solidified alloy is heat-treated, a great quantity of heat is generated through the crystallization, thus making it difficult to control the heat treatment conditions to desired ranges. Consequently, the resultant magnetic properties degrade and are not improvable.

In various preferred embodiments of the present invention, an element M such as Ti is added to the material alloy at an appropriate mole fraction. Then, a structure including a microcrystalline $R_2Fe_{14}B$ phase or a structure in which the microcrystalline $R_2Fe_{14}B$ phase and amorphous phase coexist can be obtained substantially without precipitating the α-Fe phase of an excessively large grain size in the rapidly solidified alloy. In this manner, the excessive grain growth of the $R_2Fe_{14}B$ phase is prevented. Thus, a high-performance composite permanent magnet, which has a mean particle size of about 20 nm to about 150 nm even after the heat treatment and in which soft magnetic phases such as the α-Fe phase are distributed finely, can be obtained. When about 0.5 at % to about 5 at % of Ti is added, the mole fraction of R is preferably controlled to about 6 at % to about 9 at %.

Hereinafter, specific examples of preferred embodiments of the present invention will be described with reference to the accompanying drawings.

In this preferred embodiment, a rapidly solidified alloy is prepared preferably by using the strip caster shown in FIG. 1. The alloy preparation process is performed within an inert atmosphere to prevent the material alloy, which includes rare earth element R and Fe that are easily oxidizable, from being oxidized. The inert gas may be either a rare gas of helium or argon, for example, or nitrogen, or other suitable gas. The rare gas of helium or argon is preferred to nitrogen, because nitrogen reacts with the rare earth element R relatively easily.

Strip Casting Process

The strip caster shown in FIG. 1 is disposed in a chamber in which a reduced-pressure inert atmosphere can be created. As shown in FIG. 1, the strip caster preferably includes a melting crucible 1, a chill roller 7, a shoot (tundish) 5, and a scraper gas jet 9. First, a material alloy is melted in the melting crucible 1. Next, the melt 3 is guided from the melting crucible 1 onto the chill roller 7 by way of the shoot 5 so as to be rapidly cooled and solidified on the roller 7. The melt 3, which has been rapidly solidified on the chill roller 7, then leaves the roller 7 as a thin strip 8 as the roller 7 rotates. The scraper gas jet 9 is provided to make the thin-strip alloy 8 easily peelable from the chill roller 7.

The melting crucible 1 can feed the melt 3, prepared by melting the material alloy, onto the shoot 5 at a substantially constant feeding rate. This feeding rate is arbitrarily controllable by tilting the melting crucible 1 at a desired angle, for example. In this preferred embodiment, a material alloy, having an oxygen concentration of about 1,000 ppm or less in mass percentage, is melted, and the oxygen concentration of the molten alloy is controlled at about 3,000 ppm or less in mass percentage. As described above, the oxygen concentration of the melt is changeable with the partial pressure of oxygen in the atmosphere or the time it takes the molten alloy to be rapidly solidified. Accordingly, in this preferred embodiment, the oxygen concentration of the melt is controlled at no greater than about 3,000 ppm by adjusting these conditions.

The outer circumference of the chill roller 7 is preferably made of a material having relatively good thermal conductivity (e.g., copper). The roller 7 may preferably have a diameter (2r) of about 30 cm to about 100 cm and a width of about 15 cm to about 100 cm. The roller 7 can be rotated at a predetermined velocity by a motor (not shown). By controlling this rotational velocity, the surface velocity of the chill roller 7 is arbitrarily adjustable. The cooling rate achieved by this strip caster is controllable within a range of from about $10^2$° C./sec to about $2 \times 10^5$° C./sec by selecting an appropriate rotational velocity for the chill roller 7, for example.

The surface of the shoot 5 on which the melt 3 is guided forms a tilt angle α with respect to the horizontal plane X. The distance between the far end of the shoot 5 and the surface of the chill roller 7 is preferably within about several millimeters or less. Also, the shoot 5 is arranged such that the line connecting the far end of the shoot 5 to the center of the chill roller 7 forms an angle β (where $0 \leq \beta \leq 90$ degrees) with respect to the horizontal plane X. The tilt angle α of the shoot 5 is an important parameter for finely controlling the melt flow velocity and is preferably between about 1 and about 80 degrees, and more preferably between about 10 and about 45 degrees. The angle β is a parameter that changes the degree of contact between the roller 7 and the melt 3 and is preferably between about 0 and about 90 degrees, more preferably between about 5 and about 80 degrees.

After having poured onto the shoot 5, the melt 3 will be teemed from the far end of the shoot 5 onto the surface of the chill roller 7 without being pressurized, thereby forming a melt puddle 6 thereon. In this preferred embodiment, the kinematic viscosity of the melt 3 is maintained at about $5 \times 10^{-6}$ m²/sec or less. Accordingly, the melt 3 can be teemed smoothly enough and can keep close contact with the surface of the chill roller 7 due to the pressure generated by its flow over the shoot 5.

The shoot 5 is preferably made of a ceramic such as a sintered compact of alumina. The shoot 5 can rectify the flow of the melt 3 by delaying the flow velocity of the melt 3 to such a degree as to temporarily reserve the flow of the melt 3 that is being continuously fed from the melting crucible 1 at a predetermined flow rate. This rectification effect may be further increased with a dam plate for selectively damming back the surface flow of the melt 3 poured onto the shoot 5.

By using this shoot 5, the melt 3 can be teemed so as to have a substantially constant width in the longitudinal direction of the chill roller 7. As used herein, the "longitudinal direction" of the chill roller 7 is equivalent to the axial direction of the roller 7 (i.e., the direction coming out of the paper). Also, the melt 3 being teemed can be spread so as to have a substantially uniform thickness. In addition, the shoot 5 can also adjust the temperature of the melt 3 that is going to reach the chill roller 7. The temperature of the melt 3 on the shoot 5 is preferably higher than the liquidus temperature thereof by about 100° C. or more. This is because if the temperature of the melt 3 is too low, then initial crystals of $TiB_2$, for example, which will affect the properties of the resultant rapidly solidified alloy, might locally nucleate and remain in the rapidly solidified alloy. Also, if the temperature of the melt 3 is too low, then the viscosity of the melt 3 is increased and the melt 3 is much more likely to splashes.

The temperature of the melt 3 on the shoot 5 is controllable by adjusting the temperature of the melt 3 that is being teemed from the melting crucible 1 toward the shoot 5 or the heat capacity of the shoot 5 itself, for example. If necessary, a shoot heater (not shown) may be provided specially for this purpose.

The shoot 5 of this preferred embodiment preferably includes a plurality of drains, which are spaced apart from each other at regular intervals in the axial direction of the chill roller 7, at the far end thereof that faces the outer circumference of the chill roller 7. The width of each of these drains (corresponding to the width of each melt flow) preferably falls within a range from about 0.5 cm to about 10.0 cm, more preferably from about 0.7 cm to about 4.0 cm. In the present preferred embodiment, each melt flow has a width of about 1 cm at its corresponding drain. It should be noted that each melt flow tends to increase its width laterally as the melt flow travels farther away from its associated drain. Where a number of drains are provided on the shoot 5 to form multiple melt flows as is done in this preferred embodiment, each adjacent pair of melt flows should not come into contact with each other.

After the melt 3 has been poured onto the shoot 5, the melt 3 is separated into a plurality of melt flows so that each melt flow has substantially the same width as that of its associated drain in the axial direction of the chill roller 7. Then, each of these melt flows comes into contact with the chill roller 7. Thereafter, each melt flow 3, which has been teemed onto the chill roller 7 at a predetermined width, moves upward on the circumference surface of the roller 7 as the roller 7 rotates. In this manner, the melt flow 3 is rapidly cooled while moving along with the roller 7. It should be noted that to prevent the melt from leaking, the distance between the far end of the shoot 5 and the chill roller 7 should preferably be about 3 mm or less, and more preferably from about 0.4 mm to about 0.7 mm.

The interval between each adjacent pair of drains is preferably between about 1 cm and about 10 cm. In this manner, the melt 3 can be brought into contact with the outer circumference of the chill roller 7 at mutually separate positions. Then, each melt flow that has been teemed through its associated drain can be cooled effectively. Consequently, even if the melt 3 is poured onto the shoot 5 at an increased rate, the desired cooling rate is realizable.

It should be noted that the shoot 5 does not have to have the configuration described above. Alternatively, the shoot 5 may have just one drain or each melt flow may be teemed at an increased width. Other modifications to the shoot 5 may also be made as desirable.

After the melt 3 has been rapidly solidified on the outer circumference of the chill roller 7, the rapidly solidified alloy leaves the chill roller 7 as a thin-strip solidified alloy 8. In the present preferred embodiment, each melt flow, which has been teemed through associated one of the drains, is solidified as a strip of a predetermined width. Then, the solidified alloy 8 is crushed and collected by a collector (not shown).

As described above, the strip casting process does not use any nozzle unlike a jet casting process. That is to say, the strip casting process does not experience any of the various problems associated with the jet casting process. Specifically, in the strip casting process, the melt ejection speed is not limited by the diameter of the nozzle or the melt is not solidified at the nozzle, either, to clog the nozzle up with the unintentionally solidified alloy. Thus, the strip casting process is very effective for mass production. Furthermore, no nozzle heating equipment or no melt head pressure control mechanism is needed. As a result, the initial equipment and the equipment operation costs are greatly reduced advantageously.

Also, in the jet casting process, the nozzle is not recyclable and therefore should be disposed of once used even though it usually needs a high processing cost to form the nozzle. In contrast, the strip casting process allows a repeated use of the shoot, thus requiring a much lower equipment operation cost.

Furthermore, in the strip casting process using the guide, the chill roller can be rotated at a lower velocity and the weight of the melt teemed can be increased as compared to the jet casting process. Thus, the resultant thin-strip rapidly solidified alloy can be thicker and can be collected more easily.

The upper limit of the preferred melt feeding rate (i.e., the weight of the melt processed per unit time) may be defined as a feeding rate per unit width of the melt/roller surface contact area. In the strip casting process, the melt comes into contact with the chill roller so as to have a predetermined contact width in the axial direction of the chill roller. Accordingly, the melt quenching condition greatly depends on the melt feeding rate per unit contact width.

If the melt feeding rate is too high, then the melt is quenched by the chill roller at a decreased rate. As a result, a rapidly solidified alloy, which has not been amorphized or nano-crystallized sufficiently but includes a crystallized structure of an excessive particle size at an excessive volume percentage, is made unintentionally. That is to say, a material alloy suitably applicable to producing a nanocomposite magnet cannot be obtained. Thus, in this preferred embodiment, the feeding rate (kg/min) per unit contact width (cm) is preferably about 3 kg/min/cm or less.

Also, where three melt flows are brought into contact with the chill roller so that each melt flow has a contact width of about 2 cm, the feeding rate should preferably be about 0.5 kg/min/cm or more. Then, a processing rate of about 3 kg/min or more is realized.

In the present preferred embodiment, the melt is teemed at a feeding rate falling within the prescribed range onto the chill roller that rotates at a surface velocity falling within the particular range. In this manner, a desired rapidly solidified alloy can be manufactured with high productivity even by the strip casting process. The strip casting process does not use any nozzle, which considerably increases the process cost as in a jet casting process, for example. Accordingly, no nozzle cost is required and the problems caused by stoppage of the production process due to the nozzle clogging are eliminated.

In the present preferred embodiment, the surface velocity of the chill roller may be about 5 m/sec or more but preferably less than about 20 m/sec. The reason is as follows. If the roller surface velocity is less than about 5 m/sec, then the cooling ability of the roller is too low to obtain the desired rapidly solidified alloy. On the other hand, if the roller surface velocity is about 20 m/sec or more, then it is difficult for the roller to bring the melt upward. Instead, the cooled and solidified alloy will scatter as thin flakes, thus possibly making it hard to collect the alloy as intended. The best surface velocity of the roller is changeable with the structure or material of the chill roller and the melt feeding rate. However, if the surface velocity is too high, then the resultant thin-strip alloy will be extremely thin. When the strip is too thin, it piles up with a low density and occupies a large volume in the chamber. What is worse, if the surface velocity is too high, the particles of the magnet powder, obtained by pulverizing the thin-strip alloy, will be of a thin, flattened platelet shape. Thus, when such a magnet powder is molded, the magnet powder will show a decreased flowability. Also, the die cavities can be filled with such a magnet powder at a decreased percentage. As a result, the resultant magnet has a decreased magnet powder percentage and exhibits deteriorated properties. Moreover, when such a magnet powder is compressed, a large recoil or spring-back is observed upon removal of pressure, and consequently, the dimensional accuracy of the molded magnet will decrease. On the other hand, if the surface velocity is too low, it is difficult to realize a sufficiently high cooling rate. To increase the cooling rate, the melt feeding rate may be decreased. In that case, however, the productivity would decrease disadvantageously and the strip casting process would not be the best method anymore. In view of these considerations, the surface velocity of the chill roller is preferably between about 5 m/sec and about 20 m/sec, more preferably between about 6 m/sec and about 15 m/sec and even more preferably between about 10 m/sec and about 15 m/sec.

It should be noted that if the melt feeding rate per unit contact width exceeds approximately 3 kg/min/cm, then the predetermined cooling rate cannot be realized and it is hard to make the desired rapidly solidified alloy. An appropriate range of the feeding rate per unit contact width is changeable with the surface velocity and structure of the roller. Preferably, the feeding rate per unit contact width is about 2 kg/min/cm or less, more preferably about 1.5 kg/min/cm or less.

By appropriately determining the shape and configuration of the shoot (tundish) 5, the width and the number of the melt drains and the melt feeding rate, for example, the resultant thin-strip rapidly solidified alloy should have an average thickness and width that are within preferred ranges. The thin-strip rapidly solidified alloy preferably has a width of about 15 mm to about 80 mm. Also, the thin-strip alloy may not be too thin or too thick. If the solidified alloy is too thin, then the tap density thereof will be low and it is hard to collect the alloy as intended. Nevertheless, if the solidified alloy is too thick, then the alloy may have been cooled on the melt/roller contact surface and on the free surface (i.e., melt surface) at mutually different cooling rates. That is to say, a portion of the alloy around the free surface may have been cooled at an insufficient rate. In view of these considerations, the thin-strip alloy preferably has a thickness between about 50 μm and about 250 μm, more preferably between about 60 μm and about 200 μm, and even more preferably between about 70 μm and about 90 μm. Also, considering the packing density of the powder in a bonded magnet, the thin-strip alloy preferably has a thickness of greater than about 80 μm.

Heat Treatment

In the present preferred embodiment, the heat treatment is preferably conducted within an argon atmosphere. Preferably, the alloy is heated at a temperature increase rate of about 5° C./sec to about 20° C./sec, kept heated at a temperature between about 550° C. and about 850° C. for a period of time from approximately 30 seconds to approximately 20 minutes and then cooled to room temperature. This heat treatment results in nucleation and/or crystal growth of metastable phases in a remaining amorphous phase, thus forming a nanocomposite microcrystalline structure. According to the present preferred embodiment of the present invention, the microcrystalline $R_2Fe_{14}B$ ($Nd_2Fe_{14}B$) phase already accounts for about 60 volume % or more of the total volume of the alloy yet to be heat-treated (i.e., as-cast alloy) when the alloy has a composition including about 6 at % to about 9 at % of R (Nd) and about 0.5 at % to about 5 at % of M (Ti). Thus, when the heat treatment is conducted under these conditions, α-Fe and other crystalline phases will not increase their sizes too much and the respective constituent phases other than the microcrystalline $Nd_2Fe_{14}B$ phase (i.e., the soft magnetic phases) will be distributed finely and uniformly in a grain boundary between the microcrystalline $Nd_2Fe_{14}B$ grains. After the heat treatment, the $R_2Fe_{14}B$ ($Nd_2Fe_{14}B$) phase constitutes about 65 vol % to about 85 vol % of the alloy.

If the heat treatment temperature is lower than about 550° C., then a lot of amorphous phases may remain even after the heat treatment and the resultant coercivity may not reach the desired level depending on the conditions of the rapid cooling process. On the other hand, if the heat treatment temperature exceeds about 850° C., the grain growth of the respective constituent phases will advance too much, thus decreasing the remanence $B_r$ and deteriorating the loop squareness of the demagnetization curve. For these reasons, the heat treatment temperature is preferably from about 550° C. to about 850° C., more preferably from about 570° C. to about 820° C.

In this preferred embodiment, the melt always has an appropriate viscosity and can be quenched constantly enough. Accordingly, a metal structure in which amorphous phases are present, a metal structure in which an Fe—B or $Nd_2Fe_{14}B$ phase coexists in an amorphous phase, or a metal structure in which a sufficient amount of crystal grains of the $Nd_2Fe_{14}B$ phase is distributed uniformly and finely in a rapidly solidified alloy, is obtained. Therefore, even if the rapidly solidified alloy is not heat-treated, the solidified alloy itself may exhibit hard magnetic properties. That is to say, the heat treatment for crystallization is not indispensable for the present invention. However, to further improve the magnet properties, the heat treatment is preferably conducted. In addition, even though the heat treatment is carried out at lower temperatures than the known process, the magnet properties still can be improved significantly.

To prevent the alloy from being oxidized, the heat treatment is preferably conducted within an inert gas (e.g., Ar or $N_2$ gas) atmosphere at about 50 kPa or less. The heat treatment may also be carried out within a vacuum of about 0.1 kPa or less.

Before the heat treatment, the rapidly solidified alloy may include metastable phases such as $Fe_3B$, $Fe_{23}B_6$ and $R_2Fe_{23}B_3$ phases in addition to the $R_2Fe_{14}B$ ($Nd_2Fe_{14}B$) and amorphous phases. In that case, when the heat treatment is over, the $R_2Fe_{23}B_3$ phase will have disappeared. Instead, crystal grains of an iron-based boride (e.g., $Fe_{23}B_6$), showing a saturation magnetization that is substantially equal to or even higher than that of $R_2Fe_{14}B$ phase, or α-Fe phase can be grown. It should be noted that the "$Fe_3B$ phase" herein includes an "$Fe_{3.5}B$ phase".

In preferred embodiments of the present invention, even if the soft magnet phases like the α-Fe phase that have crystal grain sizes smaller than that of the $R_2Fe_{14}B$ phase exist in the resultant magnet having a microcrystalline structure, excellent magnetic properties are still achievable because the soft and hard magnetic phases are magnetically coupled together through exchange interactions.

After the heat treatment, the $Nd_2Fe_{14}B$ phase should preferably have an average crystal grain size of about 300 nm or less, which is a single magnetic domain size. The average crystal grain size of the $Nd_2Fe_{14}B$ phase is preferably from about 20 nm to about 150 nm, more preferably from about 20 nm to about 100 nm. On the other hand, if the ferromagnetic iron-based boride and α-Fe phases have an average crystal grain size of more than about 50 nm, then the exchange interactions among the respective constituent phases weakens, thus deteriorating the loop squareness of the demagnetization curve and decreasing $(BH)_{max}$. Normally, these phases do not precipitate as very small crystallites (of a size smaller than 1 nm in diameter) but are formed as crystallites of a size as large as a few nm in diameter. For these reasons, the soft magnetic phases, such as the boride and α-Fe phases, should preferably have an average crystal grain size of about 1 nm to about 50 nm. To further improve the magnetic properties, the $Nd_2Fe_{14}B$ phase more preferably has an average crystal grain size of about 20 nm to about 100 nm and the soft magnetic phases more preferably have an average crystal grain size of about 1 nm to about 30 nm. Also, the average crystal grain size of the $Nd_2Fe_{14}B$ phase is preferably greater than that of the soft magnetic phases.

It should be noted that the thin strip of the rapidly solidified alloy may be coarsely cut or pulverized before subjected to the heat treatment.

After heat-treated, the resultant magnetic alloy may be finely pulverized to obtain a magnet powder. Then, various types of bonded magnets can be made from this powder by performing known manufacturing and processing steps on the powder. In making a bonded magnet, the magnet powder of the iron-based rare earth alloy is compounded with an epoxy or nylon resin binder and then molded into a desired shape. In this case, a magnet powder of any other type (e.g., an Sm—Fe—N type magnet powder or hard ferrite magnet powder) may be mixed with the nanocomposite magnet powder.

Using the resultant bonded magnet of this preferred embodiment, motors, actuators and various other rotating machines can be produced.

Where the magnet powder of various preferred embodiments of the present invention is used for an injection-molded bonded magnet, the powder is preferably pulverized to have a mean particle size of approximately 200 $\mu$m or less, more preferably from about 30 $\mu$m to about 150 $\mu$m. On the other hand, where the magnet powder is used for a compacted bonded magnet, the powder is preferably pulverized to have a mean particle size of about 300 $\mu$m or less, more preferably from about 30 $\mu$m to about 250 $\mu$m and even more preferably from about 50 $\mu$m to about 200 $\mu$m with a bimodal size distribution.

Preferred Composition

Q is B (boron) only or a combination of B and C (carbon) or C only. If the mole fraction x of Q is less than about 10 at %, then it is difficult to make the desired rapidly solidified alloy, in which the microcrystalline $R_2Fe_{14}B$ and amorphous phases coexist, at a relatively low cooling rate of about $10^{2°}$ C./sec to about $10^{5°}$ C./sec. In addition, the strip casting method, which is one of the most cost-effective techniques among various melt quenching methods, cannot be adopted in that case, and the price of the resultant permanent magnet product increases unintentionally. On the other hand, if the mole fraction x of Q exceeds approximately 30 at %, then very little (amount of) $R_2Fe_{14}B$ phase will precipitate and desired hard magnetic properties are not realizable. In view of these considerations, the mole fraction x of Q is preferably between about 10 at % and about 30 at %, more preferably between about 11 at % and about 15 at %. It should be noted that if the ratio of C to Q exceeds about 50%, then no Fe—B phase with high magnetization will be produced, thus deteriorating the resultant magnetic properties. Accordingly, the ratio of C to Q is preferably about 50% or less, more preferably about 30% or less and even more preferably 20% or less. To decrease the viscosity of the melt, the mole fraction of C is preferably about 0.5 at % or more. In any case, the balance of Q is B.

R is at least one element selected from the rare earth elements (including yttrium (Y)). Preferably, R includes substantially no La or Ce. This is because if La or Ce is included, R (typically Nd) included in the $R_2Fe_{14}B$ phase should be replaced with La or Ce, thus decreasing the coercivity and the loop squareness of the demagnetization curve. However, the magnetic properties will not be affected so seriously if a very small percentage (i.e., about 0.5 at % or less) of La or Ce exists as an impurity inevitably contained to reduce the cost of the rare earth material. Therefore, the phrase "substantially no La (Ce)" or "substantially excluding La (Ce)" herein means that the content of La (Ce) is about 0.5 at % or less.

More specifically, R preferably includes Pr or Nd as an indispensable element, a portion of which may be replaced with Dy and/or Tb. If the mole fraction y of R is less than about 2 at %, then fine grains with the microcrystalline $R_2Fe_{14}B$ structure, which is needed for realizing the coercivity, do not crystallize sufficiently and the desired high coercivity $H_{cJ}$ cannot be obtained. On the other hand, if the mole fraction y of R is equal to or greater than about 10 at %, then the percentages of the iron-based borides with ferromagnetic properties and $\alpha$-Fe decrease so much that the borides and $\alpha$-Fe do not contribute to increasing the remanence $B_r$ anymore. For these reasons, the mole fraction y of the rare earth element R is preferably equal to or greater than about 2 at % but less than about 10 at %, more preferably from about 3 at % to about 9.5 at % and even more preferably from about 4 at % to about 9.2 at %. Where the mole fraction y of the rare earth element R is between about 6 at % and about 9.2 at %, the melt should be rapidly cooled and solidified while keeping close contact with the surface of the chill roller. Accordingly, the concentration of oxygen in the melt should preferably be about 2,000 ppm or less in that case.

M is one, two or more elements selected from the group consisting of Al, Si, Ti, V, Cr, Mn, Cu, Zn, Ga, Zr, Nb, Mo, Ag, Hf, Ta, W, Pt, Au and Pb. By adding the element(s) M, not only improvement of magnetic properties but also expansion of optimum heat treatment temperature range are realized advantageously. If the mole fraction z of the additive element(s) M exceeds about 10 at %, then the magnetization decreases. Accordingly, the mole fraction z is preferably from about 0 at % to about 10 at %, more preferably from about 0.1 at % to about 5 at %.

The balance of the material alloy, other than the elements Q, R and M, may be Fe alone. Alternatively, at least one transition metal element T selected from the group consisting of Co and Ni may be substituted for a portion of Fe, because the desired hard magnetic properties are realizable in that case also. However, if more than about 50% of Fe is replaced with T, then a high remanence $B_r$ of about 0.7 T or more cannot be obtained. For that reason, the percentage of Fe replaced is preferably from about 0% to about 50%. Also, by substituting Co for a portion of Fe, the loop squareness of the demagnetization curve improves and the Curie temperature of the $R_2Fe_{14}B$ phase increases, thus increasing the thermal resistance of the alloy. The percentage of Fe that is replaceable with Co is preferably within a range from about 0.5% to about 40%.

EXAMPLE 1

For each of the samples Nos. 1 to 12 shown in the following Table 1, the respective materials B, Fe, Co, Nd, Ti and Cr with purities of about 99.5% or more were weighed so that the sample had a total weight of about 80 kg and then the mixture was put into a crucible of alumina. Thereafter, these alloy materials were melted by an induction heating method within an argon (Ar) atmosphere at a pressure of about 70 kPa, thereby preparing a melt of the alloy. After the temperature of the melt had reached about 1350° C., the crucible was tilted to pour the melt onto the surface of a rotating chill roller of copper by way of a shoot made of alumina, thereby making a rapidly solidified alloy. In this case, the chill roller was rotated at a surface velocity of about 15 m/sec, the melt was fed at a rate of 5 kg/min, and the shoot was disposed so that the shoot formed an angle $\alpha$ of about 20 degrees with a horizontal plane and that the line connecting the far end of the shoot to the center of the chill roller formed an angle $\beta$ of about 40 degrees with a horizontal plane.

TABLE 1

| | Alloy composition (at %) | | | | O₂ concentration |
|---|---|---|---|---|---|
| | Fe | B | R | M | of melt (ppm) |
| EXAMPLES | | | | | |
| 1 | Fe76 + Co1 | 18.5 | Nd4.5 | — | 400 |
| 2 | Fe71 + Co3 | 18.5 | Nd4.5 | Cr3 | 500 |
| 3 | Fe79.3 | 10.5 | Nd8.2 | Ti2 | 650 |
| 4 | Fe70.2 + Co3 | 14 | Nd8.8 | Ti4 | 800 |
| 5 | Fe76 + Co1 | 18.5 | Nd4.5 | — | 2150 |
| 6 | Fe71 + Co3 | 18.5 | Nd4.5 | Cr3 | 1280 |
| 7 | Fe79.3 | 10.5 | Nd8.2 | Ti2 | 1440 |
| 8 | Fe70.2 + Co3 | 14 | Nd8.8 | Ti4 | 1620 |
| COMP | | | | | |
| 9 | Fe76 + Co1 | 18.5 | Nd4.5 | — | 3300 |
| 10 | Fe71 + Co3 | 18.5 | Nd4.5 | Cr3 | 5400 |
| 11 | Fe79.3 | 10.5 | Nd8.2 | Ti2 | 3090 |
| 12 | Fe70.2 + Co3 | 14 | Nd8.8 | Ti4 | 4370 |

In Table, "Fe70.2+Co3", for example, means that about 70.2 at % of Fe and about 3 at % of Co are included as ferrous transition metal elements in the material alloy.

Also, in Table 1, the samples Nos. 1 through 8 represent examples of the preferred embodiments of present invention, while the samples Nos. 9 through 12 represent comparative examples. The main difference between the examples of preferred embodiments of the present invention and the comparative examples lies in the concentration of oxygen contained in the melt. Thus, the concentrations of oxygen contained in the respective melts in the crucible are described on the rightmost column of Table 1.

The oxygen concentrations were measured in the following manner. Specifically, first, a tube made of Mo was inserted into the melt in the crucible and then evacuated. A relatively low pressure was created in the tube with respect to the melt in the crucible, thereby sucking the melt up from the crucible into the tube. Thereafter, the melt in the tube was cooled and solidified to obtain a cylindrical ingot. Subsequently, the surface of the ingot was ground to remove an oxide film therefrom and the ingot was pulverized into particles with a size of about 300 μm or less. And then the particles obtained in this manner had their oxygen concentration measured by an $O_2$ gas analyzer (e.g., EMGA-550 W produced by Horiba, Ltd.)

The concentrations of oxygen in the melts were controlled to the respective values shown in Table 1 by adjusting the pressure of the atmosphere inside the melting chamber and/or the partial pressure of oxygen. More specifically, as for the samples Nos. 1 to 4, the melting chamber was evacuated to about $5 \times 10^{-2}$ Pa and then an inert gas was supplied thereto, thereby setting the pressure of the inert atmospheric gas inside the chamber at about 70 kPa and the partial pressure of oxygen inside the chamber at about 1 Pa or less. As for the samples Nos. 5 to 8, the pressure of the atmosphere and the partial pressure of oxygen inside the chamber were controlled to about 70 kPa and to a range from about 10 Pa to about 50 Pa, respectively. On the other hand, as for the samples Nos. 9 through 12 representing the comparative examples, the pressure of the atmosphere and the partial pressure of oxygen inside the chamber were controlled to about 70 kPa and to a range from about 1 kPa to about 1.5 kPa, respectively.

The following Table 2 shows the kinematic viscosities, each of which was obtained by dividing the viscosity of a melt having one of compositions shown in Table 1 (as measured at 1350° C. by using a oscillating viscometer) by the density of the melt. Table 2 also shows the hard magnetic properties of respective magnets that were produced by rapidly solidifying the melts and then subjecting the rapidly solidified alloys to a heat treatment under optimum conditions.

TABLE 2

| | Kinematic viscosity ($\times 10^{-6}$ m²/sec) | $(BH)_{max}$ (kJ/m³) | $B_r$ (T) | $H_{cJ}$ (kA/m) |
|---|---|---|---|---|
| EXAMPLES | | | | |
| 1 | 1.6 | 93 | 1.09 | 285 |
| 2 | 1.2 | 99 | 1.04 | 388 |
| 3 | 1.1 | 128 | 0.93 | 640 |
| 4 | 1.2 | 110 | 0.80 | 1128 |
| 5 | 1.8 | 88 | 1.04 | 272 |
| 6 | 1.4 | 91 | 1.02 | 390 |
| 7 | 2.2 | 122 | 0.87 | 597 |
| 8 | 3.7 | 95 | 0.76 | 1131 |
| COMP | | | | |
| 9 | 9.3 | 19 | 0.52 | 43 |
| 10 | 16.8 | 24 | 0.61 | 159 |
| 11 | 34 | 11 | 0.55 | 104 |
| 12 | 48.1 | 14 | 0.48 | 339 |

As can be seen from Table 2, each of the samples Nos. 1 through 8 representing the examples of preferred embodiments of the present invention had a kinematic viscosity of less than about $5 \times 10^{-6}$ m²/sec, while each of the samples Nos. 9 through 12 representing the comparative examples had a kinematic viscosity of greater than about $5 \times 10^{-6}$ m²/sec. It can also be seen that each of these examples of preferred embodiments of the present invention showed higher maximum energy product $(BH)_{max}$ and higher remanence $B_r$ than any of the comparative examples. The comparative examples showed deteriorated magnetic properties. This reason is believed to be as follows. Specifically, in each of these comparative examples, the concentration of oxygen in the melt exceeded about 3,000 ppm and the kinematic viscosity thereof was too high. Accordingly, the melt could not flow smoothly and could not keep good contact with the surface of the chill roller, thus advancing the rapid cooling process non-uniformly.

EXAMPLE 2

An alloy was made from a material alloy having the composition No. 3 shown in Table 1 using the strip caster shown in FIG. 1 under the same conditions as those of the first example except the shoot angle α and the concentration of oxygen in the melt. The following Table 3 shows whether or not each of various shoot angle/oxygen concentration combinations allowed a puddle of the melt to be formed on the roller surface constantly enough to obtain the desired quenched alloy (SC alloy):

TABLE 3

| EXAMPLES | Shoot angle α | O₂ concentration (ppm) | How SC alloy was Formed |
|---|---|---|---|
| 1 | 10 | 120 | ○ |
| 2 | 10 | 1290 | Δ |
| 3 | 10 | 2220 | X |
| 4 | 10 | 2500 | X |

TABLE 3-continued

| EXAMPLES | Shoot angle α | O$_2$ concentration (ppm) | How SC alloy was Formed |
|---|---|---|---|
| 5 | 20 | 420 | ○ |
| 6 | 20 | 1040 | ○ |
| 7 | 20 | 1510 | Δ |
| 8 | 20 | 2230 | X |
| 9 | 30 | 340 | ○ |
| 10 | 30 | 1330 | ○ |
| 11 | 30 | 1720 | Δ |
| 12 | 40 | 220 | Δ |
| 13 | 40 | 1520 | ○ |
| 14 | 40 | 2140 | X |
| 15 | 50 | 430 | Δ |
| 16 | 50 | 1530 | ○ |
| 17 | 50 | 2320 | X |

In Table 3, the open circles ○ indicate that the desired SC alloy could be obtained successfully; the crosses X indicate that no puddle of the melt could be formed on the roller surface and the SC alloy could not be obtained; and the triangles Δ indicate that a puddle of the melt could be formed only inconstantly to make the rapidly solidified structure of the SC alloy too non-uniform to realize actually applicable magnetic properties.

As can be seen from the results of these examples, where the melt has an oxygen concentration of about 2,000 ppm or less, the shoot angle α is preferably about 10 degrees to about 50 degrees, more preferably from about 20 degrees to about 30 degrees.

INDUSTRIAL APPLICABILITY

According to various preferred embodiments of the present invention, the concentration of oxygen in the melt of a material alloy is controlled to a predetermined range, thereby keeping the viscosity of the melt low enough. Therefore, the melt can flow smoothly and can maintain an appropriate contact with the surface of a chill roller in a strip caster. As a result, the melt can be rapidly cooled and solidified by the chill roller uniformly and with good reproducibility. Thus, it is possible to mass-produce a rapidly solidified alloy that has a uniform microcrystalline structure required for a high-performance nanocomposite magnet.

What is claimed is:

1. A method of making a material alloy for an iron-based rare earth magnet, the method comprising the steps of:

preparing a melt of an iron-based rare earth material alloy, the material alloy having a composition represented by the general formula: $(Fe_{1-m}T_m)_{100-x-y-z}Q_xR_yM_z$, where T is at least one element selected from the group consisting of Co and Ni; Q is at least one element selected from the group consisting of B and C; R is at least one element selected from the group consisting of Y (yttrium) and the rare earth elements; and M is at least one element selected from the group consisting of Al, Si, Ti, V, Cr, Mn, Cu, Zn, Ga, Zr, Nb, Mo, Ag, Hf, Ta, W, Pt, Au and Pb, the mole fractions x, y, z and m satisfying the inequalities of:

10 at % $\leq$ x $\leq$ 30 at %;
2 at % $\leq$ y < 10 at %;
0 at % $\leq$ z $\leq$ 10 at %; and
0 $\leq$ m $\leq$ 0.5, respectively;

feeding the melt of the material alloy onto a guide and forming a flow of the melt on the guide for transfer to a chill roller so as to move the melt onto a region where the melt comes into contact with the chill roller;

rapidly cooling the melt using the chill roller to make a rapidly solidified alloy; and controlling an oxygen concentration of the melt yet to be fed onto the guide such that the oxygen concentration is about 3,000 ppm or less in mass percentage.

2. The method of claim 1, further comprising the step of controlling a kinematic viscosity of the melt yet to be fed onto the guide such that the kinematic viscosity of the melt is about $5\times10^{-6}$ m$^2$/sec or less.

3. The method of claim 1, wherein the rapid cooling step comprises the step of using, as the guide, a shoot that controls the flow of at least a portion of the melt running down toward the surface of the chill roller rotating to bring the melt into contact with the surface of the chill roller such that the melt has a predetermined width in an axial direction of the chill roller, the shoot being disposed near the chill roller and including a melt drain that has the predetermined width in the axial direction of the chill roller, and wherein the rapid cooling step further comprises the step of making the rapidly solidified alloy from the melt that has come into contact with the chill roller.

4. The method of claim 1 wherein the rapid cooling step comprises the step of precipitating an $R_2Fe_{14}B$ phase.

5. A method for producing a permanent magnet, the method comprising the step of heat-treating the rapidly solidified alloy, prepared by the method of claim 1 to form a structure in which three or more crystalline phases, including at least $R_2Fe_{14}B$, α-Fe and boride phases, are present, an average crystal grain size of the $R_2Fe_{14}B$ phase is between about 20 nm and about 150 nm, and an average crystal grain size of the α-Fe and boride phases is between about 1 nm and about 50 nm.

6. The method of claim 5 wherein the heat-treating step comprises the step of maintaining the rapidly solidified alloy at a temperature of about 550° C. to about 850° C. for approximately 30 seconds or more.

7. The method of claim 5 wherein the boride phase comprises an iron-based boride phase with ferromagnetic properties.

8. The method of claim 1 wherein the iron-based boride phase comprises at least one of $Fe_3B$ and $Fe_{23}B_6$.

9. A method for producing a permanent magnet by using a powder of the rapidly solidified alloy that has been prepared by the method of claim 1.

10. A method for producing a bonded magnet, the method comprising the steps of:

preparing a powder of the permanent magnet according to the method of claim 5; and processing the powder of the permanent magnet into the bonded magnet.

* * * * *